May 7, 1957  R. A. MAHLMEISTER  2,791,066
MACHINE TOOL
Filed Feb. 18, 1955  2 Sheets-Sheet 1
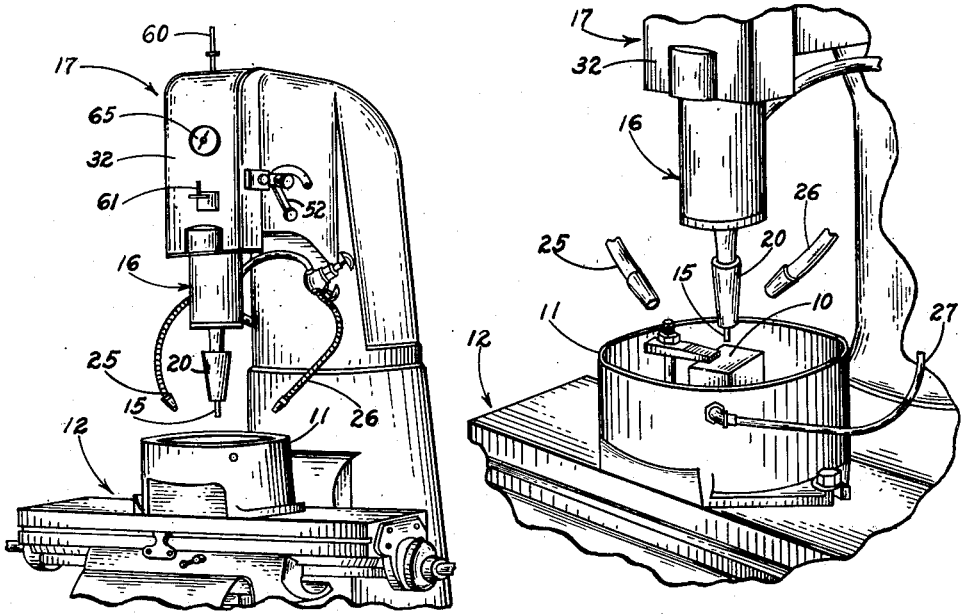
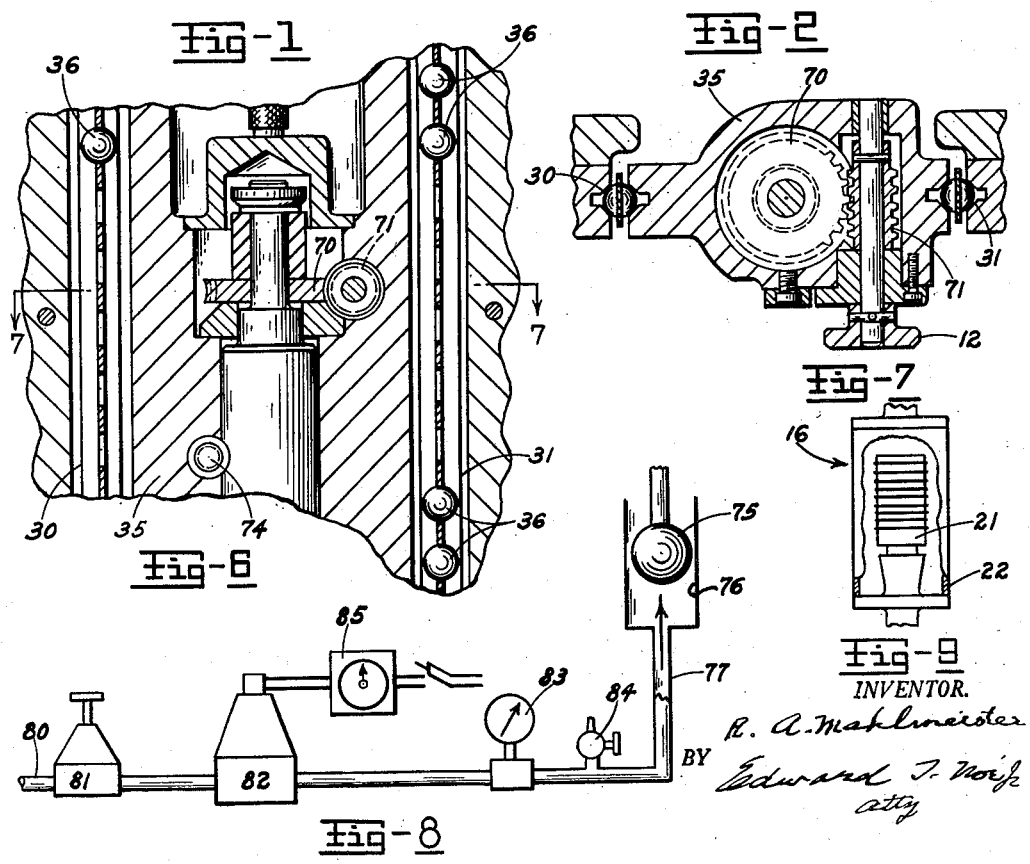
INVENTOR.
R. A. Mahlmeister
BY Edward T. Noir Jr.
atty May 7, 1957 R. A. MAHLMEISTER 2,791,066
MACHINE TOOL
Filed Feb. 18, 1955 2 Sheets-Sheet 2

INVENTOR.
R. A. Mahlmeister
BY Edward J. Noé Jr.
atty

United States Patent Office 2,791,066
Patented May 7, 1957

2,791,066

MACHINE TOOL

Raymond A. Mahlmeister, Dayton, Ohio, assignor, by mesne assignments, to Bendix Aviation Corporation, a corporation of Delaware Application February 18, 1955, Serial No. 489,243

10 Claims. (Cl. 51—59)

This invention relates to an apparatus for forming materials by means of a forming tool reciprocating at high frequencies and more particularly to an apparatus for supporting and controlling movements of the tool and its driver.

It is an object of this invention to provide a support for carrying high frequency reciprocating tool and its driver for friction-free movement toward and from the work with the tool being urged into association with the work under an adjustably predetermined pressure.

It is a further object to provide such a support wherein the tool and driver are supported for rectilinear movement toward and from the work on antifriction bearing elements and are suspended at one end of an adjustably counterbalanced rocking lever carried for pivoting movement on an antifriction support, whereby friction is minimized in the entire system and the tool and driver are carried for easy movement toward and from the work and under a constant pressure toward the work during forming.

It is a further object to provide such a support wherein the tool is adjustably rotatable to orientate the tool as desired relative to the work, the support having provision for rapidly raising the tool from the work and retaining it in its retracted position.

It is a further object to provide a forming apparatus wherein a forming tool reciprocating at high frequencies and through minute amplitudes is urged toward the work under a predetermined constant pressure, an abrasive in liquid suspension being applied to the tool and the work, the tool and its driver being cyclically retracted from the work against the applied pressure by a retractive movement superimposed on the high frequency reciprocations whereby the work area being formed is periodically flooded with abrasive.

It is a further object to provide such an apparatus wherein the frequency of the superimposed retractive movements is adjustably controlled as expedient for each forming operation.

It is a further object to provide such an apparatus wherein the tool and driver are periodically retracted by means of an air actuated piston, the air circuit including a control valve adjustable to a desired frequency of operation and flow regulating means whereby the periodic retraction can be controlled as desired.

Figure 4:
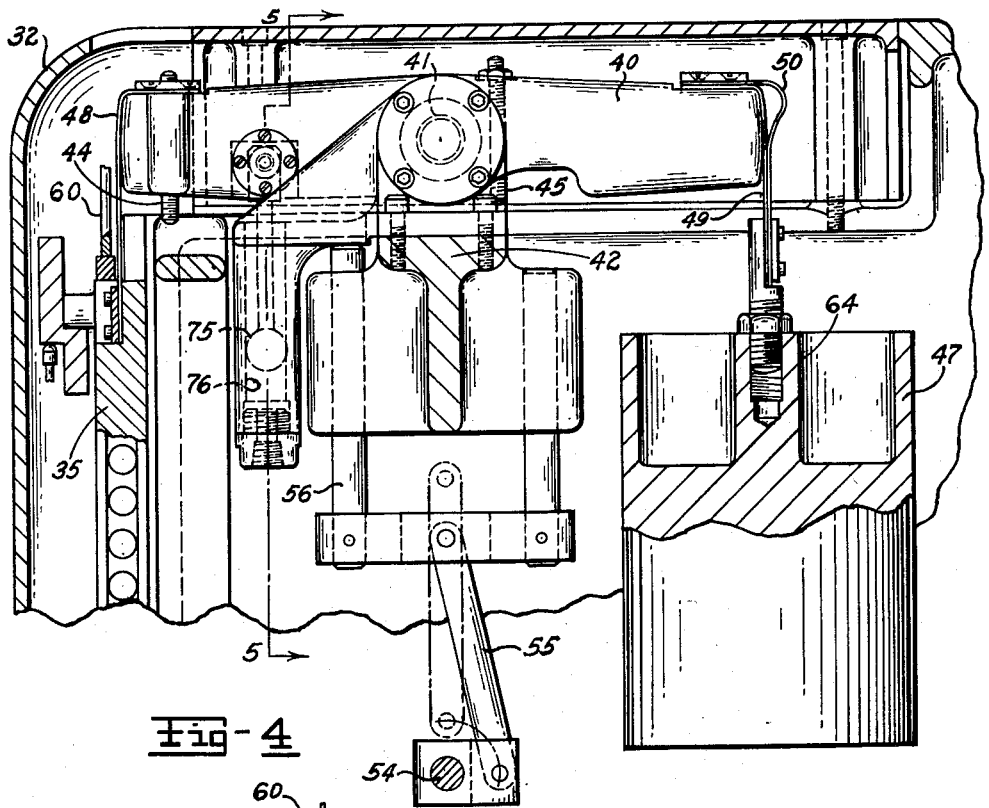
Figures 3, 5:
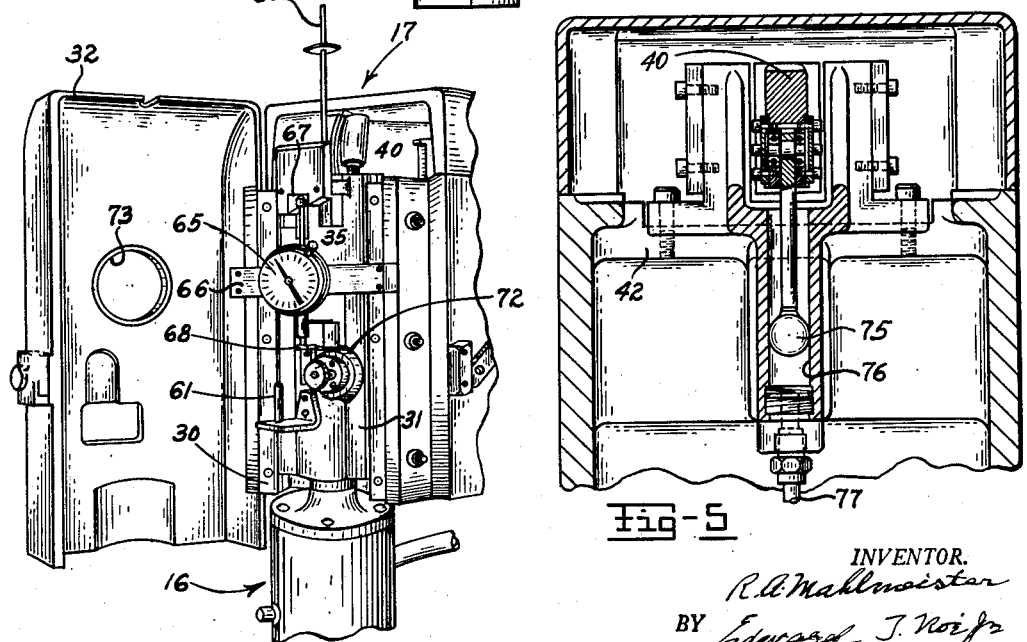

Other objects and advantages of the invention will be apparent from the following description, the appended claims, and the accompanying drawing, in which, Figure 1 is a fragmentary perspective view of a machine embodying the features of the present invention, illustrating the work support and tool head, Figure 2 illustrates the association of the forming tool and the work, Figure 3 discloses the slide arrangement by which the tool and its driver are supported for friction-free vertical movement, shown with the front cover of the tool head swung open, Figure 4 is a longitudinal central section of the upper portion of the tool head illustrating primarily the counterbalance means for the slide and the components which it supports, Figure 5 is a sectional view on line 5—5 of Figure 4 taken through a portion of the pulsator mechanism for periodically retracting the tool from the work, Figure 6 is a sectional view through the slide and the mechanism for rotating the tool and driver about a vertical axis to orientate the tool relative to the work as desired, Figure 7 is a view on line 7—7 of Figure 6, Figure 8 is a diagrammatic representation of an air circuit for periodically superimposing a retractive movement on the high frequency tool reciprocations in order that the work and tool may be periodically flooded with the supplied abrasive, and Figure 9 is a fragmentary view of the driver for the tool shown with its housing partially broken away to disclose the magnetostrictive transducer for converting electrical energy to mechanical tool reciprocations.

The present invention provides apparatus for obtaining more rapid and accurate forming in those machines which are especially adapted for forming extremely hard or brittle materials by means of a forming tool which reciprocates at high frequencies. Frequencies in the ultrasonic range are usually employed and will be hereinafter referred to. In the exemplary machine illustrated for purpose of disclosing the present invention alternating current of a suitable frequency and magnitude along with a required direct current bias are supplied to a magnetostrictive transducer which converts the supplied electrical energy into mechanical reciprocations of a tool at ultrasonic frequencies. Both the tool and the work are supplied with an abrasive in liquid suspension and when the tool is urged toward the work while reciprocating at an ultrasonic frequency rapid machining of extremely hard materials is achieved.

In the present invention, as illustrated, the tool and its magnetostrictive driver are mounted on a vertical slide supported for friction-free vertical movement upon rocking of a lever to which the slide is attached. The lever is also supported for friction-free pivoting and carries a counterweight at its opposite end. Both the counterweight and slide are connected to the rocking lever by means of flexible straps whereby friction-free connections are obtained. In order to control the forming pressure applied on the tool toward the work, provision is made upon the vertical slide for supporting counterweights which can be readily placed and removed depending upon the requirements of any particular application. Through this structural arrangement the most efficient forming is made possible. Through the minimization of friction in its support, the tool is free for smooth movement under a delicately controlled pressure to achieve the most rapid and accurate forming.

It has been found that more rapid forming is achieved if the tool is at times lifted against the forming pressure to retract it from the work and allow the work area being formed to be completely flooded and flushed by the supplied abrasive. In accordance with the illustrated embodiment of the present invention an air circuit is provided to periodically energize a piston connected to the rocking lever to rock the lever, raise the slide, and obtain a periodic retractive movement of the tool superimposed upon its ultrasonic reciprocation to insure that the tool is always operating in cooperation with fresh abrasive.

Provision is made for orienting the tool about a vertical axis and relative to the work. In the disclosed apparatus both the tool and its driver are mounted on the slide for precise rotation by means of a worm and worm gear arrangement in order that this orientation can be accurately accomplished in an efficient manner. Thus, for example, when a square tool is being employed if it is desired to obtain spaced holes of different orientations the tool can be easily rotated between the forming operations.

Referring more particularly to the drawings it will be seen that the work 10 is clamped in position within an abrasive collector 11 mounted on the upper surface of a work supporting arrangement 12 including a compound table assembly mounted on the machine base. The tool 15 is vertically reciprocated by means of a transducer assembly 16 mounted on a vertical slide within the tool head 17.

During a forming operation the tool 15 is urged downward toward the work under a predetermined pressure by means of structure later described in detail. The tool 15 is connected by means of a tool holder 20 to the lower end of a magnetostrictive transducer or driver 21 (see Figure 9) supported within a cylindrical carrier 22 of assembly 16. The magnetostrictive driver 21 during operation is continually flooded with coolant by structure not illustrated in detail. Driver 21 is supplied with electrical energy at ultrasonic alternating frequencies and through the tool holder 20, which is shaped to provide desired amplitude changes between its output and input ends, reciprocates tool 15 vertically at ultrasonic frequencies and minute amplitudes giving extremely high tool accelerations. In usual applications the frequency is on the order of 20,000 to 30,000 cycles per second and the amplitude on the order of 2 to 4 thousandths of an inch. Both the tool and work are supplied with a suitable abrasive in liquid suspension through adjustable conduits 25 and 26. The collector 11 is also constantly flushed with abrasive supplied from the same source through conduit 27. A return from collector 11 is also provided.

The slide and counterbalance support for the tool 15 and its driver are disclosed most particularly in Figures 3, 4, 6 and 7. Bearing ways 30 and 31 are provided at the forward face of tool head 17 within hinged cover 32. Antifriction bearing elements cooperate between these ways and slide 35 to guide it for friction-free vertical movement. In the illustrated embodiment these antifriction elements are spaced ball pairs 36 which precisely guide slide 35 while reducing friction to a minimum. A rocking lever 40 is pivotally supported at substantially its midpoint by means of antifriction bearings 41 supported at substantially its midpoint by means of antifriction bearings 41 supported on a web 42 extending between the side walls of the tool head. Other antifriction pivot supports, such as a knife edge for example, can also be utilized. Rocking movements of lever 40 are adjustably limited in one direction by a stop projection 44 and in the other by a projection 45, engaging portions of the tool head at their adjusted rocking limits.

A counterweight 47 is attached to the inner end of lever 40 while slide 35 is attached at its outer end. Straps 48 and 49 support slide 35 and counterweight 47 at the respective ends of lever 40. The opposite ends of lever 40 are arcuate about the center of pivoting to avoid side thrusts on either of the carried components during rocking of the lever. A safety strap 50 is provided for counterweight 47 to carry the weight if strap 49 should break. The use of these flexible straps in conjunction with the antifriction support of lever 40 and the supporting of slide 45 by the spaced ball pairs insures that friction is minimized and stickiness in the slide movement is eliminated.

A crank 52 (see Figure 1) which can be locked at its extreme limits of swinging is connected through a shaft 54 and a linkage 55 to a vertically guided plunger assembly 56. Upon rocking of crank 52 in one direction, plunger 56 is raised to engage lever 40 between its pivot axis and its outer end to rock the lever and raised the slide and the tool away from the work 10. Plunger 56 can be withdrawn by means of crank 52 to release the lever and allow movement of the slide and tool toward the work.

It is necessary that the downward pressure against the tool and toward the work be adjusted as desired for different forming operations. Although different driver and tool assemblies can be mounted on slide 35, usually the counterweight 47 is sufficient to counterbalance the downward force. Supports 60 and 61 are provided on slide 35 to receive smaller weights in order that this counterbalance can be overcome to the extent desired for the particular operation involved. Supports 61 and 60 extend through openings provided in cover 32 when the cover is closed. If necessary to achieve the desired pressure shot can be poured into a cavity 64 in the upper end of counterweight 47.

A gauge such as a dial indicator 65 cooperates between the slide and the machine base to measure movement of the tool and its depth during forming. In the illustrated apparatus dial indicator 65 is supported in a fixed position on bar 66 extending between ways 30 and 31. The oppositely extending work contactors of the indicator engage projections at 67 and 68 on the forward face of slide 35. Thus the gauge is precisely actuated and stickiness is avoided during movement of the slide in either direction. The face of the dial indicator is visible through an opening 73 in cover 32.

The magnetostrictive driver 21 and tool 15 are adjustably rotated relative to slide 35 in order to orient the tool 15 with respect to the work. The particular illustrated adjustment is shown in detail in Figures 6 and 7. The upper portion of transducer assembly 16 is journaled for rotation about its vertical axis within the lower end of slide 35. A worm gear 70 is fixed to the upper end of assembly 16 and meshes with a worm 71 which is adjustably rotated through a knob 72 at the forward face of slide 35 to precisely orientate the tool as desired. Suitable clamping means are provided at 74 (see Figure 6) to clamp the assembly in its adjustably rotated positions. Through this structural arrangement the tool is rotated for necessary orientation with respect to the work by an extremely simple mount for the transducer assembly 16, tool holder 20, and tool 15. This provides extremely accurate settings in a simple mechanism.

After continued reciprocations of the tool while under pressure toward the work and especially after an extended depth in a hole has been formed, it is possible that the abrasive grit between the tool and the work will become worn and less abrasive. In order to overcome this effect and to provide more rapid and precise forming, structure has been provided through this invention for periodically retracting the tool from the work through retractive movements superimposed upon continued ultrasonic reciprocations of the tool to allow the full flooding of flushing of the work area being formed. A spherical piston 75 operates within an air cylinder 76 and is connected at its upper end through antifriction bearings means with the lever 40 between the pivot axis and outer end of the lever. Cylinder 76 is periodically supplied with air under pressure through conduit 77 to raise piston 75, rock lever 40, and retract the slide 35 and tool 15 from the work. When the supply of air through conduit 77 is cut off following the retractive movement, air leakage past piston 75 allows the gradual lowering of the tool under a predetermined pressure back into association with the work 10.

Figure 8 illustrates diagrammatically an exemplary air circuit. Air is supplied under pressure from a suitable source through connection 80 and flows through a regulator 81, a periodically actuated valve 82, a pressure gauge 83, an adjustable relief 84, and conduit 77 to cylinder 76. A commercially available electrical timer 85 is operative to control a solenoid and actuate valve 82 at frequencies as desired. The regulator 81 can be adjusted to obtain the necessary air pressures and the relief 84 provides an adjustable leakage to atmosphere before the cylinder 76 to stabilize the flow through the system. Through the adjustments provided the actuation of piston 75 and the retractive movements of the tool can be controlled precisely to obtain retractive movements of the tool superimposed upon the reciprocations thereof at frequencies as necessary for different forming operations. These frequencies will be determined by the hardness of the material being formed, the area being formed, the tool shape, and like conditions. Through this arrangement the work is periodically flooded with fresh abrasive and the forming operation is rendered more efficient. The retractive movements are automatically obtained at an adjusted frequency to provide optimum forming results.

Thus it is seen that a support has been provided for an ultrasonic driver and its tool to urge the tool toward the work under a predetermined steadily applied pressure. Friction has been minimized throughout the supporting system and the tool is precisely guided and urged into engagement with the work for most efficient forming. Provision has been made for accurately rotating the tool with respect to the work in an assembly which is simple to manufacture but which provides precise results. Through the mechanism for periodically retracting the tool from the work, retractive movements are automatically superimposed upon tool reciprocations of the tool to allow the work area to be flooded with fresh abrasive with the periodic retraction being closely controlled and optimum forming results being obtained thereby.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A support for a reciprocatory tool and driver, comprising a base, vertical ways on said base, a slide, antifriction bearing means cooperating between said ways and said slide guiding the slide for friction-free vertical movement, means on said slide for supporting a tool driver assembly for rectilinear movement with the slide toward and from the work and for adjustable rotation about a vertical axis, a lever, antifriction support means carrying said lever from said base for pivoting about a horizontal axis between the lever ends, a flexible strap connecting the slide to one end of said lever, a counterweight, a flexible strap connecting said counterweight to the other end of said lever, support means on said slide for receiving balancing weights acting in opposition to said counterweight whereby the downward force against the tool and toward the work can be controlled and accurately maintained during forming operations as desired, and releasable means for locking said slide in an upper position.

2. An apparatus for forming materials by means of a high frequency reciprocating tool, comprising a base, vertical ways on said base, a slide, antifriction bearing means cooperating between said ways and said slide guiding the slide for friction-free vertical movement, a tool supporting transducer adapted for connection to a source of power and for driving a tool for vertical reciprocation at minute amplitudes and high frequencies, means mounting said transducer on said slide for adjustable rotation about a vertical axis to orient a tool relative to the work as desired, a lever, means supporting said lever from said base for pivoting about a horizontal axis between the lever ends, means connecting the slide to one end of said lever, a counterweight, means connecting said counterweight to the other end of said lever, support means on said slide for receiving weights whereby the downward force against the tool and toward the work can be precisely controlled for forming operations as desired, and means for locking the transducers slide in an upper position.

3. An apparatus for forming materials by means of a high frequency reciprocating tool, comprising a base, vertical ways on said base, a slide, bearing means cooperating between said ways and said slide guiding the slide for friction-free vertical movement, a magnetostrictive driving unit adapted for connection to a source of power, a tool, means at the lower end of said unit connecting said tool for vertical reciprocations at minute amplitudes and high frequencies, means on said slide mounting said unit for rectilinear movement with the slide toward and from the work, a lever, means supporting said lever from said base for pivoting about a horizontal axis between the lever ends, means connecting the slide to one end of said lever, a counterweight, means connecting said counterweight to the other end of said lever, support means on said slide for receiving weights whereby the downward force against the tool and toward the work can be controlled for operations as desired, a plunger carried for vertical sliding in said support for movement to engage the lever at a point on its lower surface between the pivot axis and the connection to the slide, and actuating means connected to said plunger for upward movement of the plunger to engage and rock the lever to retract the tool from the work and for downward movement of the plunger to release the lever for free pivoting movement whereby the tool is urged toward the work under a pressure determined by the cooperating weights.

4. An apparatus for forming materials by means of a high frequency reciprocating tool, comprising a base, means on said base for supporting the work in adjustably fixed positions, vertical ways on said base above said work support, a slide, bearing means cooperating between said ways and said slide guiding the slide for friction-free vertical movement a magnetostrictive driving unit adapter for connection to a source of power, a tool, means at the lower end of said unit connecting said tool for vertical reciprocation at minute amplitudes and high frequencies, means on said slide supporting said unit for rotation about a vertical axis and for rectilinear movement with the slide toward and from the work, adjustable means cooperating between said slide and unit for rotation of the unit and tool about the axis of rotational adjustment, said adjustment means including a worm gear fixed with respect to the unit and a worm carried in the slide in mesh with the worm gear and rotatable for fine adjustments of the unit and tool whereby the tool can be precisely orientated relative to the work, a lever, antifriction support means carrying said lever from said base for pivoting about a horizontal axis between the lever ends, a flexible strap connecting the slide to one end of said lever, a counterweight, a flexible strap connecting said counterweight to the other end of said lever, gauging means cooperating between said base and said slide for gauging the tool movement during a forming operation, support means on said slide for receiving weights whereby the downward force against the tool and toward the work can be controlled for operations as desired, a plunger carried for vertical sliding in the support and positioned to engage the lever at a point on its lower surface between the pivot axis and the connection to the slide, and actuating means connected to said plunger to move the plunger upward to rock the lever and retract the tool from the work and downward to release the lever and allow movement of the tool into association with the work under a pressure determined by the cooperating weights.

5. An apparatus for forming materials by means of a high frequency reciprocating tool, comprising a base, means on said base for supporting the work in adjustably fixed positions, a tool, a transducer adapted for connection to a source of power and connected to said tool for driving the tool at high frequencies and minute amplitudes, means for supplying an abrasive in liquid suspension to the tool and work, means carrying said transducer for movement along the axis of tool reciprocation including means urging the tool toward the work under a predetermined pressure, and automatic means for cyclically moving said carrying means along said axis to periodically retract the tool from the work and allow full flooding of the work area with abrasive including means for dampening the downward return to avoid impact of the tool and work.

6. An apparatus for forming materials by means of an ultrasonically vibrating tool, comprising a base, means on said base for supporting the work in adjustably fixed positions, a magnetostrictive driving unit adapted for connection to a source of electrical power at ultrasonic frequencies, a tool, means mounting said tool at one end of said unit for reciprocation at ultrasonic frequencies and minute amplitudes, means for supplying an abrasive in liquid suspension to the tool and work, means carrying said transducer above said work supporting means for vertical movement along the axis of tool reciprocation including means for urging the tool toward the work under a predetermined pressure, actuating means connected to said carrying means for raising the transducer and tool to retract the tool from the work, and cyclically operable control means operatively associated with said actuating means for automatic periodic actuation thereof to periodically superimpose a retractive movement on the ultrasonic tool reciprocations to allow flooding of the work area with fresh abrasive including means for preventing forceful impact of tool and work on return movement.

7. An apparatus for forming materials by means of an ultrasonically reciprocating tool, comprising a base, means on said base for supporting the work in adjustably fixed positions, a magnetostrictive driving unit adapted for connection to a source of electrical power of ultrasonic frequency, a tool, means mounting said tool at one end of said unit for reciprocation at ultrasonic frequencies and minute amplitudes, means for supplying an abrasive in liquid suspension to the tool and work, vertical ways on said base above said work supporting means, a slide, bearing means cooperating between said ways and said slide guiding the slide for friction-free vertical movement, counterbalance means acting on said slide for obtaining a predetermined downward force on the tool toward the work, drive means operatively connected to said slide for cyclic upward movements thereof against the downward force to retract the tool from the work, and including adjustable timing means whereby a retracting tool movement is periodically superimposed upon the ultrasonic forming reciprocations thus allowing the periodic flooding of the work area with abrasive between periods of cyclically repeated forming reciprocations.

8. An apparatus for forming materials by means of an ultrasonically reciprocating tool applied thereto, comprising a base, means on said base for supporting the work in adjustably fixed positions, a magnetostrictive driving unit adapted for connection to an energizing source of electrical power of ultrasonic frequency, a tool, means mounting said tool at one end of said unit for reciprocation at ultrasonic frequencies and minute amplitudes, means for supplying an abrasive in liquid suspension to the tool and work, vertical ways on said base above said work supporting means, a slide, bearing means cooperating between said ways and said slide guiding the slide for friction-free vertical movement, means on said slide for supporting the magneto-strictive unit and tool for rectilinear movement with the slide along the tool axis and toward and from the work, a lever, antifriction support means carrying said lever from said base for pivoting about a horizontal axis between the lever ends, means connecting the slide to one end of said lever, a counterweight, means connecting said counterweight to the other end of said lever, support means on said slide for receiving balancing weights whereby the downward force against the tool and toward the work can be controlled as desired, actuating means connected to said lever to periodically rock the lever to raise the slide and retract the tool from the work against the downward applied force, and adjustable timing means associated with said actuating means whereby a retracting tool movement is periodically superimposed upon the ultrasonic forming reciprocations thus allowing the periodic flooding of the work area with abrasives.

9. An apparatus for forming materials by means of an ultrasonically reciprocating tool comprising a base, means on said base for supporting the work in adjustably fixed positions, a magnetostrictive driving unit adapted for connection to a source of electrical power of ultrasonic frequency, a tool, means mounting said tool at one end of said unit for reciprocation at ultrasonic frequencies and minute amplitudes in a forming operation, means for supplying an abrasive in liquid suspension to the tool and work, vertical ways on said base above said work supporting means, a slide, bearing means cooperating between said ways and said slide guiding the slide for friction-free vertical movement, means on said slide for supporting the unit for rectilinear movement with the slide along the axis of the tool toward and from the work, a lever, antifriction support means carrying said lever from said base for pivoting about a horizontal axis between the lever ends, a flexible strap connecting the slide to one end of said lever, a counterweight, a flexible strap connecting said counterweight to the other end of said lever, support means on said slide for receiving balancing weights whereby the downward force against the tool and toward the work can be controlled for operations as desired, an air cylinder, a piston in said cylinder, means operatively connecting said piston to said lever at a point displaced from the lever pivot axis, conduit means connected to said cylinder and adapted for connection to a source of air under controlled pressure, valve means in said conduit, an adjustable timing means operatively associated with said valve for periodic actuations thereof to cyclically move said piston and rock said lever to lift the slide and obtain a periodic retracting tool movement superimposed upon the ultrasonic forming reciprocations, thus allowing the periodic flooding of the work area with abrasives between periods of ultrasonic forming reciprocations.

10. An apparatus for forming materials by means of a high frequency reciprocating tool, comprising a base, a carrier mounted for vertical movement on said base, a magnetostrictive tool driving unit adapted for connection to a source of electrical power, means at the lower end of said unit for carrying a tool for vertical reciprocations at minute amplitudes and ultransonic frequencies, means mounting said unit on said carrier for adjustable rotation about a vertical axis and fixed against axial movement relative thereto, antifriction guide means cooperating between said base and said carrier at each side of the carrier and disposed in a common plane with the axis of rotation of the magnetostrictive unit, means providing for an adjustable downward force on said carrier, and manually actuated means for raising said carrier against the downward force and locking it in an upward position.

References Cited in the file of this patent
UNITED STATES PATENTS

| 652,978 | Pohl | July 3, 1900 |
| 1,048,841 | Locke | Dec. 31, 1912 |
| 1,195,344 | Feller | Aug. 22, 1916 |
| 1,704,130 | Hunt | Mar. 5, 1929 |
| 2,452,211 | Rosenthal | Oct. 26, 1948 |
| 2,580,716 | Balamuth | Jan. 1, 1952 |

OTHER REFERENCES

Publication: "The Machinist," May 1, 1954 (Magazine), pages 753–755.